United States Patent Office 3,632,621
Patented Jan. 4, 1972

3,632,621
NOVEL OXIMECARBAMATES
Roger Williams Addor, Pennington, and Frank Albert Wagner, Jr., Hopewell, N.J., assignors to American Cyanamid Company, Stamford, Conn.
No Drawing. Filed Jan. 30, 1968, Ser. No. 701,572
Int. Cl. C07c *131/00*
U.S. Cl. 260—453 R          7 Claims

ABSTRACT OF THE DISCLOSURE

New compounds of the formula:

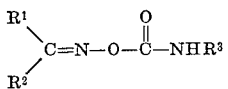

wherein $R^1$ is either lower-alkylthio, ar(lower-alkyl)thio, arylthio or lower-alkenylthio; $R^2$ is $R^1$ or chloro; and $R^3$ is lower-alkyl. The compounds are useful as nematocides, insecticides and acaricides.

---

This invention relates to and has for its object the provision of new oxime carbamates. It relates further to the provision of pesticidal compositions containing said new ozime carbamates and, still further, to the use of these compositions as insecticides, acaricides and nematocides.

The compounds according to this invention are represented by the following Formula I:

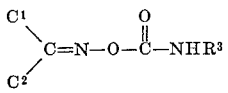

wherein $R^1$ is either lower-alkylthio, ar(lower-alkyl)thio, arylthio or lower-alkenylthio; $R^2$ is $R^1$ or chloro; and $R^3$ is lower-alkyl.

The term "lower-alkyl" includes straight, branched and cyclic saturated hydrocarbon radicals having up to seven carbons, as exemplified by methyl, ethyl, n-propyl, n-butyl, sec.-butyl, amyl, sec.-amyl, n-hexyl, cyclohexyl and n-heptyl.

The term "ar(lower-alkyl)" includes monocyclic and bicyclic radicals having from one to six carbon atoms in the alkyl radical. The aryl radicals may be phenyl or naphthyl or lower-alkyl substituted analogues thereof. Preferred ar(lower-alkyl) are benzyl and phenethyl radicals.

The term "aryl" includes such aryl moieties as were described in the preceding paragraph.

The term "lower-alkenyl" includes alkenyl radicals of one to seven carbon atoms as for example allyl and methallyl as well as alkenyl radicals having an aryl substituent, e.g. styryl or cinnamyl.

Among the compounds which are included in the scope of Formula I are:

O-(methylcarbamoyl) methylthiochloroformaldehyde oxime
O-(propylcarbamoyl) butylthiochloroformaldehyde oxime
O-(ethylcarbamoyl) butylthiochloroformaldehyde oxime
O-(propylcarbamoyl) benzylthiochloroformaldehyde oxime
O-(ethylcarbamoyl) phenylthiochloroformaldehyde oxime
O-(methylcarbamoyl) allylthiochloroformaldehyde oxime
O-(butylcarbamoyl) methallylthiochloroformaldehyde oxime
O-(methylcarbamoyl) bis-methylthioformaldehyde oxime
O-(propylcarbamoyl) bis-butylthioformaldehyde oxime
O-(methylcarbamoyl) (methylthio)ethylthioformaldehyde oxime
O-(ethylcarbamoyl) (methylthio)butylthioformaldehyde oxime
O-(methylcarbamoyl) bis-benzylthioformaldehyde oxime
O-(ethylcarbamoyl) bis-phenylthioformaldehyde oxime
O-(butylcarbamoyl) bis-allylthioformaldehyde oxime
O-(ethylcarbamoyl) bis-metallylthioformaldehyde oxime The compounds of this invention are prepared by reacting at least one mole of a carbamate of dichloroformaldehyde oxime represented by the Formula II:

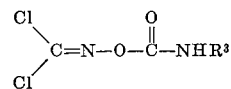

with one mole of a mercaptan of the Formula III:

$$R^1SH \qquad \text{III}$$

wherein $R^1$ and $R^3$ are as defined above. When the oxime is reacted with only one mole of mercaptan, the product which is obtained is that of Formula I wherein $R^2$ is chloro. When two moles of mercaptan are reacted, the compounds of Formula I wherein $R^2$ is not chloro, are obtained. When the oxime is reacted with two moles of mercaptan, it is possible to employ one mole each of different mercaptans. In this case, the mercaptans can be reacted either concurrently or sequentially.

Preferably, the reaction is carried out in the presence of a base at a temperature ranging from minus 50° to plus 30° C. It is desirable to employ an inert reaction medium such as a lower alkanol, an alkyl ether (e.g., ethyl ether), a cyclic ether (e.g., tetrahydrofuran), a halogenated aliphatic hydrocarbon (e.g., chloroform), a lower alkenone (e.g., acetone), or an aromatic solvent such as benzene.

A basic material is necessary to effect the addition of the mercaptans to the carbamate of dichloroformaldehyde oxime. Among the suitable basic materials are sodium hydroxide, potassium hydroxide, triethylamine, tributylamine, dimethylaniline, diethylene diamine and potassium t-butoxide.

The carbamate of dichloroformaldehyde oxime used as a starting material for the preparation of the compounds of Formula I of this invention are disclosed and claimed in copending application Ser. No. 640,330, filed May 22, 1967 (Case No. 21,892). These compounds are conveniently prepared by reacting one mole of phosgene oxime with a mole of a lower-alkyl isocyanate. The reaction is conducted in the presence of a solvent such as benzene and from 1 to 10% by weight of a basic catalyst such as triethylamine.

The compounds of Formula I have pesticidal activity and can be used as insecticides and soil nematocides in the protection of decorative foliage and agronomic crops from infestations of insects and ascarids such as the Southern Armyworm, Nasturtium Aphids, Two-Spotted Spider Mite, Confused Flour Beetle, Large Milkweed Bug, German Cockroach, and the Southern Corn rootworm. For use as an insecticide, nematocide or acaricide the compounds of Formula I are incorporated in an effective amount (generally btween about 0.1 and 95.0% by weight of the composition) into an active formulation containing a conventionally useful diluent. The diluent may be chosen so as to give a solid or liquid formulation. Solid diluents such as talc, kaolin, attapulgite and diatomateous earth are preferably in the form of wettable powders which may in themselves exert insecticidal activity or be biologically inactive. Likewise, liquid formulations such as water emulsions or solutions or suspensions in liquid hydrocarbons (e.g. xylene or deodorized kerosene) may be based upon insecticidally inert liquid diluents or be a combination of such diluents with insecticidally active liquid material. The particular formulation which is chosen depends upon factors and conditions which are normally relied upon to determine the type of formulation and the concentration of active components.

The following examples are presented to further illustrate the present invention.

EXAMPLE A

Preparation of O-methylcarbamoyl dichloroformaldehyde oxime

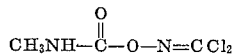

To a stirred mixture of 48.5 parts of distilled phosgene oxime and 28.4 parts (by volume) of methyl isocyanate in 150 parts (by volume) of benzene is slowly added ca. 5 parts (by volume) of triethylamine until further addition produces no noticeable exotherm. After two hours, an additional 20 parts (by volume) of methyl isocyanate is added and the mixture is allowed to stand overnight.

The resultant mixture is concentrated in vacuo and partitioned between 200 parts (by volume) of ether and 25 parts of water. The ether layer is washed with dilute hydrochloric acid, saturated sodium chloride, dried over magnesium sulfate, treated with activated charcoal, and concentrated in vacuo to yield 55.1 grams (76% based on phosgene oxime) of orange oil which crystallizes on seeding and cooling; melting point ca. 25° C. This material, combined with another 19.7 grams of crude product of similar quality in 200 milliliters of ether, is washed with 20 parts (by volume) of 5% potassium hydroxide solution (dark wash) and washing is completed as before. The dry ether solution is brought to the cloud point with 150 milliliters of petroleum ether, cooled to 0° C. and seeded. Further slow cooling to −55° C. yields light yellow crystals which are collected and washed with petroleum ether; 55.1 grams, melting point 31.5° C.–32.5° C.

Purification of O-methylcarbomyl dichloroformaldehyde oxime is also achieved by passing crude product through a film molecular still at 40°–70°/.005 mm. Hg. Under these conditions, phosgene oxime carbamate collects as a colorless solid on the condenser and is removed by subsequent replacement of cold with hot water. Unreacted phosgene oxime collects in the Dry Ice traps. A sample of this material crystallizes from 1:1 ether petroleum ether as fine white crystals, melting point 32.8° C.–33.6° C.

EXAMPLE B

Preparation of O-ethylcarbamoyl dichlorofarmaldehyde oxime

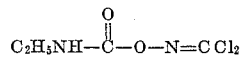

Employing the procedure of Example A, a mixture of equimolar amounts of distilled phosgene oxime and ethyl isocyanate in benzene is treated with triethylamine until no further exotherm is observed with the addition of small amounts of the triethylamine. After standing, excess ethyl isocyanate is added to the reaction mixture and the mixture is permitted to stand at room temperature for several hours. The mixture is then concentrated under reduced pressure, partitioned between ether and water, the ether layer is separated from the water and washed with hydrochloric acid followed by saturated sodium chloride, then dried and concentrated under vacuum. O-ethylcarbomyl dichloroformaldehyde oxime is recovered in good yield In similar fashion, O-isopropylcarbamoyl dichloroformaldehyde oxime is prepared employing the above procedure, but substituting isopropyl isocyanate for methyl isocyanate.

EXAMPLE 1

Preparation of O-(methylcarbamoyl ethylthiochloroformyldehyde oxime

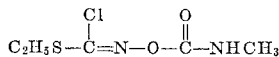

A mixture of 1.86 parts of ethanethiol and 3.37 parts of potassium t-butoxide in 25 parts of methanol was added slowly to 5.13 parts of phosgene oxime methylcarbamate in 25 parts of methanol maintained at −15° C. by a cooling bath. After addition is complete, the mixture was allowed to come to room temperature. The methanol was removed under vacuum and the residue was partitioned between 100 ml. of etherbenzene and water. The organic phase was washed successively with dilute potassium hydroxide and saturated salt solution. After filtering through magnesium sulfate, the mixture was concentrated in vacuo to give 4.54 parts of oil which crystallized on cooling. Recrystallization from ether-hexane gave 3.15 parts (53%) of colorless crystals, M.P. 37.0–38.0° C. A sample recrystallized again from analysis melted at 37.5–38.5° C.

EXAMPLE 2

Preparation of O-(methylcarbamoyl) methylthiochloroformaldehyde oxime

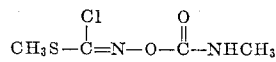

In a tared mixture of 17.5 g. (0.102 mole) of phosgene oxime methylcarbamate in 100 ml. of benzene was collected 6.2 g. (0.139 mole) of methyl mercaptan. The mixture was ice-cooled and 10.4 g. (0.102 mole) of triethylamine in 25 ml. of benzene was added with good stirring over 20 minutes. After another hour, the mixture was diluted with ether and washed 5 times with water. Drying and concentrating in vacuo left 15.7 g. (84%) of yellow oil which completely crystallized on seeding; melting point, 58–63° C. A sample was twice recrystallized from ether at about −70° C. and vacuum sublimed at 55–60° C./0.2 mm. to give colorless crystals, melting point 63.2–64.8° C.

EXAMPLE 3

Preparation of O-(methylcarbamoyl) benzylthiochloroformaldehyde oxime

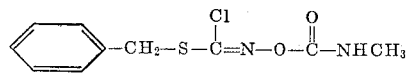

The reaction was carried out in the same manner as Example 1 replacing ethyl mercaptan with benzyl mercaptan. The crude product was recrystallized from toluene and from a toluene-hexane mixture at −15° C. to give a 61% yield of colorless plates, M.P. 103.0–105.0° C.

EXAMPLE 4

Preparation of O-(methylcarbamoyl) phenylthiochloroformaldehyde oxime

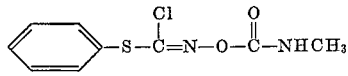

The reaction was carried out as in Example 1 replacing ethyl mercaptan with thiophenol. The crude product was recrystallized twice from toluene to give a 75% yield of slightly yellow crystals, M.P. 125.0–127.0° C.

EXAMPLE 5

Preparation of O-(methylcarbamoyl) allylthiochloroformaldehyde oxime

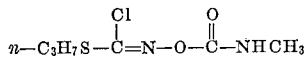

The reaction was carried out in the same manner as Example 1 except that n-propyl mercaptan replaced ethyl mercaptan and the reaction was run at −35° C. instead of −15° C. The crude product was recrystallized twice from ether-hexane at −55° C. to give a 69% yield of colorless needles, M.P. 38.5–40.0° C.

EXAMPLE 6

Preparation of O-(methylcarbamoyl) allylthiochloroformaldehyde oxime

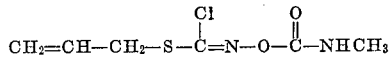

The reaction was carried out in the same manner as Example 1 except that allyl mercaptan replaced ethyl mercaptan and the reaction was run at 35° C. instead of −15° C. The crude product was purified by chromatography on silica gel using 5% methanol in benzene as the eluting solvent. The crystalline fractions were recrystallized from ether-hexane at −55° C. to give colorless crystals, M.P. 46.0–48.5° C.

EXAMPLE 7

Preparation of O-(methylcarbamoyl) t-butylthiochloroformaldehyde oxime

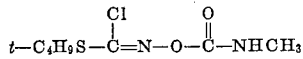

The reaction was carried out in the same manner as Example 1 replacing ethyl mercaptan with t-butyl mercaptan and with the reaction temperature at 25° C. instead of −15° C. The crude oily product could not be completely freed of an impurity, but infrared and nuclear magnetic resonance spectra attested to the presence of a large percentage of the desired compound.

EXAMPLE 8

Preparation of O-(methylcarbamoyl) bis-methylthioformaldehyde oxime

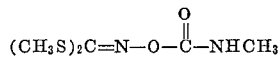

About 75 ml. of methyl mercaptan was collected in a 3-neck flask containing 10.0 g. (0.059 mole) of phosgene oxime methylcarbamate. The flask was equipped with a Dry Ice-acetone condenser and cooled with an alcohol bath at −20° C. With the system under nitrogen, 13.2 g. (0.12 mole) of potassium t-butoxide was added in small increments over about 20 minutes. The viscous mixture was stirred an additional 30 minutes after removing the cooling bath. The infrared spectrum indicated reaction was complete. After adding 50 ml. of benzene, the mixture stood open overnight. Additional benzene was added and the mixture was water-washed and dried and left in a beaker. Evaporation of solvent, seeding and further drying of the residue in a vacuum desiccator gave mostly crystalline solids. Recrystallization from ether gave 8.9 g. (78%) of colorless crystals, M.P. 57.4–58.4° C. and 57.0–58.2° C. as two crops.

EXAMPLE 9

Preparation of O-methylcarbamoyl) bis-ethylthioformaldehyde oxime

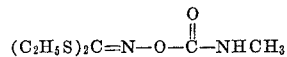

The reaction was carried out in the same manner as in Example 8 replacing methyl mercaptan with ethyl mercaptan. The crude product was recrystallized from ether to give cololrless crystals, M.P. 67.5–67.8° C.

EXAMPLE 10

Preparation of (O-methylcarbamoyloxime) (benzythio) methylthioformaldehyde oxime

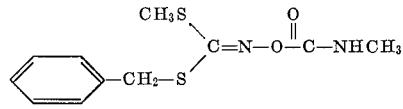

A mixture of 12.4 g. of benzyl mercaptan and 5.4 g. of sodium methoxide in 100 ml. of methanol was added dropwise over a 15 minute period to a stirred mixture of 18.3 g. of O-(methylcarbamoyl) methylthiochloroformaldehyde oxime as prepared in Example 2 in 50 ml. of methanol cooled to −10° C. After 30 minutes, the mixture was allowed to come to room temperature and was worked-up as described in Example 1. The product was isolated as a solid showing strong infrared absorption at 1500, 1710, and 3400 cm.$^{-1}$ typical of the oximecarbamate function.

EXAMPLE 11

Insecticidal and acaricidal activity

The compounds of this invention are tested for activity against common pests by the following procedures.

(1) Southern Armyworm (*Prodenia eridania* Cram.)

Compounds to be tested are made up as 0.1% solutions as above. Sieva lima bean leaves are dipped in the test solution and set in the hood to dry. When dry, they are placed in four-inch Petri dishes which have a moist filter paper in the bottom, and ten third-instar armyworm larvae about ⅜″ long are added to each dish. The dishes are covered and held at 80° F., 60% R.H. After two days, mortality counts and estimates of the amount of feeding are made.

(2) Nasturtium Aphids (*Aphis rumicis* L.)

The compounds to be tested are made up as 0.1%, .01%, and .001% solutions in 65% acetone-35% water. Three inch pots containing a nasturtium plant two inches tall and infested two days before are selected for testing. The pots are placed on a turntable (4 r.p.m.) and sprayed for two revolutions with a #15 DeVilbiss Atomizer at 20 p.s.i. air pressure. The spray tip is held about six inches from the plants and the spray is directed so as to give complete coverage of the aphids and the plants. The sprayed plants are laid on their side on white enamel trays ($9\frac{1}{2}''$ x $13\frac{1}{4}''$ x $\frac{3}{4}''$) which have had the edges coated with #50 S.A.E. oil as a barrier. Mortality estimates are made after holding for two days at 70° F., 50% R.H.

(3) Two-spotted Spider Mite (*Tetranychus telarius* I.)

Compounds to be tested are made up as 0.1% solutions in 65% acetone–35% water. Sieva lima bean plants with the first pair of leaves three to four inches in size are infested about five hours before testing, using about 100 to 200 adult mites per leaf. The infested leaves are dipped in the test solutions (in four-inch crystallizing dishes) for three seconds, and the plants set in the hood to dry. The treated plants are held for two days at 80° F., 60% R.H., and the adult mite mortality calculated by counting dead and alive adults on one leaf under the 10× binocularscope. The other leaf is held an additional five days and then is examined at 10× power to estimate the kill of eggs and newly-hatched nymphs, giving a measure of ovocidal and residual active, respectively.

(4) Confused Flour Beetle (*Tribolium confusum* Duv.)

Compounds to be tested are made up as 1.0% dusts by mixing 0.1 gm. of compound with 9.9 gm. of Pyrax ABB talc, wetting with 5 ml. of acetone and grinding in a mortar and pestle until dry. 125 mg. of this 1% dust is then blown into the top of a dust settling tower with a short blast of air at 20 p.s.i. The dust is allowed to settle on 4-inch Petri dishes for two minutes. The dishes are removed and 25 adult confused flour beetles are added immediately. The dishes are held for three days at 80° F., 60% R.H., following which mortality counts are made.

(5) Large Milkweed Bug (*Oncopeltus fasciatus* Dall.)

The 1% dusts described in the Confused Flour Beetle test are also used in this test. 25 mg. of the 1% dust is sprinkled evenly over the bottom of a 7-inch crystallizing dish using a screen-bottom plastic cup about $\frac{5}{8}$ inch in diameter as an applicator. Twenty adult bugs are added and a screen cover put on the dish. Water is supplied in 2 ounce bottles with a cotton wick. Mortality counts are made after holding for three days at 80° F., 60% R.H.

(6) German Cockroach (*Blattella germanica* L.)

The procedure is the same as for the large Milkweed Bug; however, only adult males are used in this test.

(7) Southern corn rootworm

*Diabrotica undecimpunctata howardi* Barber

The compound is formulated as a dust and incorporated into the soil at the equivalent of 10 and 50 pounds per 6-inch acre. The soil is sub-sampled into one-ounce wide mouth bottles, and ten 6- to 8-day old rootroom larvae added to each bottle, which is then capped. Mortality counts are made after six days at 80° F., 60% R.H.

Test results are summarized in Table I (reported as percent mortality).

TABLE I.—PERCENT MORTALITY

| Compound | Army-worms, .1% | Aphids .1% | Aphids .01% | Aphids .001% | Spider mite, .01% | Flour beetle, 1% | Milkweed bug, 1% | German cockroach, 1% | Rootworm Lbs. 50 acres | Rootworm Lbs. 10 acres |
|---|---|---|---|---|---|---|---|---|---|---|
| $CH_3S\diagdown C=N-O-\overset{O}{\underset{\|}{C}}-NHCH_3$ / $Cl$ | 100 | 100 | 100 | 100 | 37 | 100 | 100 | 90 | 100 | 100 |
| $CH_3S\diagdown C=N-O-\overset{O}{\underset{\|}{C}}-NHCH_3$ / $CH_3S$ | 100 | 100 | 100 | 90 | 0 | 100 | 100 | 75 | 100 | 50 |
| $C_2H_5S\diagdown C=N-O-\overset{O}{\underset{\|}{C}}-NHCH_3$ / $Cl$ | 80 | 100 | 100 | 100 | 0 | 100 | 100 | 90 | 100 | 25 |
| $C_2H_5S\diagdown C=N-O-\overset{O}{\underset{\|}{C}}-NHCH_3$ / $C_2H_5S$ | 0 | 100 | 100 | 50 | 95 | 0 | 100 | 0 | 45 | 0 |
| $n\text{-}C_3H_7S\diagdown C=N-O-\overset{O}{\underset{\|}{C}}-NHCH_3$ / $Cl$ | 60 | 100 | 100 | 20 | 81 | 100 | 100 | 85 | 45 | ---------- |
| $CH_2=CH-CH_2-S\diagdown C=N-O-\overset{O}{\underset{\|}{C}}-NHCH_3$ / $Cl$ | 60 | 100 | 100 | 90 | 0 | 92 | 100 | 10 | 20 | ---------- |
| $\text{Ph}-CH_2-S\diagdown C=N-O-\overset{O}{\underset{\|}{C}}-NHCH_3$ / $Cl$ | 0 | 100 | 100 | 90 | 0 | 0 | 0 | 0 | 0 | ---------- |
| $\text{Ph}-S\diagdown C=N-O-\overset{O}{\underset{\|}{C}}-NHCH_3$ / $Cl$ | 0 | 100 | 100 | 0 | 0 | 0 | 0 | 0 | 0 | ---------- |
| $t\text{-}C_4H_9S\diagdown C=N-O-\overset{O}{\underset{\|}{C}}-NHCH_3$ / $Cl$ | ---------- | 100 | 100 | ---------- | ---------- | ---------- | ---------- | ---------- | ---------- | ---------- |

EXAMPLE 12

Nematocidal activity

To demonstrate the nematocidal activity of several representative oxime carbamates against the root-knot nematode, test compounds are mixed with a potting soil containing root-knot nematodes (Meloidogyne sp.) eggs and larvae. One quart of soil is placed in a one-gallon stainless steel beaker. Predetermined amounts of the appropriate formulated oxime carbamate is pipetted onto the soil which is then thoroughly mixed on a mechanical mixer. The treated soil is then distributed between two pint containers. As the containers are being filled, the root-knot nematode inoculum is introduced into the soil. One week after treatment, the soil is planted to a root-knot nematode susceptible tomato plant. After a month's growing time the tomato plants are removed from the soil. The roots are washed and examined for nematode injury. The plants are rated according to the following scale:

0—Complete control.
1—High degree of control.
2—No control.

Rates of application of the toxicants are at 50, 10 or 5 lbs./acre. The results obtained are reported in Table II.

What is claimed is:

1. A compound of the formula:

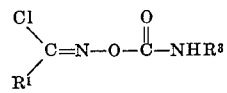

wherein $R^1$ is either lower-alkylthio, loweralkenylthio, benzylthio or phenylthio and $R^3$ is lower alkyl.

2. A compound of claim 1 wherein $R^1$ is benzylthio or phenethylthio.

3. The compound of claim 1 which is O-(methylcarbamoyl)methylthiochloroformaldehyde oxime.

4. The compound of claim 1 which is O-methylcarbamoyl)ethylthiochloroformaldehyde oxime.

5. A compound of claim 1, O-(methylcarbamoyl)-allylthiochloroformaldehyde oxime.

6. A compound of claim 1, O-(methylcarbamoyl)-benzylthiochloroformaldehyde oxime.

7. A compound of claim 1, O-(methylcarbamoyl)-phenylthiochloroformaldehyde oxime.

TABLE II

| | Root-knot nematode control | | |
|---|---|---|---|
| | 50 lbs./a. | 10 lbs./a. | 5 lbs./a. |
| $CH_3S\diagdown C=N-O-\overset{O}{\overset{\|}{C}}-NHCH_3$ / $Cl\diagup$ | ----------- | 0 | ----------- |
| $C_2H_5S\diagdown C=N-O-\overset{O}{\overset{\|}{C}}-NHCH_3$ / $Cl\diagup$ | ----------------------- | | 0 |
| $C_2H_5S\diagdown C=N-O-\overset{O}{\overset{\|}{C}}-NHCH_3$ / $C_2H_5S\diagup$ | 0 ----------------------- | | |
| $n\text{-}C_3H_7S\diagdown C=N-O-\overset{O}{\overset{\|}{C}}-NHCH_3$ / $Cl\diagup$ | 0 ----------------------- | | |
| $CH_2=CH-CH_2-S\diagdown C=N-O-\overset{O}{\overset{\|}{C}}-NHCH_3$ / $Cl\diagup$ | ----------- | 0 | ----------- |

Note.—Leaders in table indicate no data is available.

References Cited

UNITED STATES PATENTS 3,063,823  11/1962  Kühle et al. _____ 71—2.6
3,223,733  12/1965  Heiss et al. _____ 260—566

FOREIGN PATENTS 674,792  5/1966  Belgium _____ 260—566

LEON ZITVER, Primary Examiner
G. A. SCHWARTZ, Assistant Examiner

U.S. Cl. X.R.

260—566 AC; 424—327

UNITED STATES PATENT OFFICE
CERTIFICATE OF CORRECTION

Patent No. 3,632,621          Dated January 4, 1972

Inventor(s) Roger Williams Addor and Frank Albert Wagner, Jr.

It is certified that error appears in the above-identified patent and that said Letters Patent are hereby corrected as shown below:

Column 1, lines 30 and 31,

"$\begin{matrix} C^1 \\ C^2 \end{matrix}\!\!>\!\!C=N-$ " should read -- $\begin{matrix} R^1 \\ R^2 \end{matrix}\!\!>\!\!C=N-$ --.

Column 4, line 19, "ethylcarbomyl" should read -- ethylcarbamoyl --.

Signed and sealed this 2nd day of May 1972.

(SEAL)
Attest:

EDWARD M. FLETCHER, JR.
Attesting Officer

ROBERT GOTTSCHALK
Commissioner of Patents